(12) United States Patent
Rajendran et al.

(10) Patent No.: US 10,334,518 B2
(45) Date of Patent: Jun. 25, 2019

(54) POWER GAINS AND CAPACITY GAINS FOR A RELAXED FRAME ERASURE RATE

(71) Applicant: QUALCOMM Incorporated, San Diego, CA (US)

(72) Inventors: Vivek Rajendran, San Diego, CA (US); Daniel Jared Sinder, San Diego, CA (US); Venkatraman Atti, San Diego, CA (US); Saurabha Tavildar, Jersey City, NJ (US); Nikolai Leung, San Francisco, CA (US); Alireza Heidari, Encinitas, CA (US)

(73) Assignee: Qualcomm Incorporated, San Diego, CA (US)

( * ) Notice: Subject to any disclaimer, the term of this patent is extended or adjusted under 35 U.S.C. 154(b) by 80 days.

(21) Appl. No.: 15/273,280

(22) Filed: Sep. 22, 2016

(65) Prior Publication Data

US 2017/0111856 A1   Apr. 20, 2017

Related U.S. Application Data

(60) Provisional application No. 62/244,142, filed on Oct. 20, 2015.

(51) Int. Cl.
*H04W 52/02* (2009.01)
*H04L 12/815* (2013.01)
(Continued)

(52) U.S. Cl.
CPC ......... *H04W 52/0203* (2013.01); *G10L 19/22* (2013.01); *H04L 5/006* (2013.01); *H04L 45/128* (2013.01); *H04L 47/23* (2013.01); *H04L 47/2416* (2013.01); *H04L 47/29* (2013.01); *H04L 47/32* (2013.01); *H04L 65/1069* (2013.01); *H04L 65/601* (2013.01); *H04L 65/608* (2013.01); *H04L 65/80* (2013.01); *G10L 19/005* (2013.01); *Y02D 70/00* (2018.01);
(Continued)

(58) Field of Classification Search
CPC .... H04W 52/0203; H04L 47/29; H04L 47/23; H04L 5/006; H04L 47/32; H04L 45/128; H04L 47/2416; H04L 65/601; H04L 65/1069; H04L 65/608; H04L 65/80; G10L 19/22
USPC ....................................................... 370/311
See application file for complete search history.

(56) References Cited

U.S. PATENT DOCUMENTS 8,670,355 B1 * 3/2014 Frerking .............. H04R 25/554
370/252
2006/0133378 A1 * 6/2006 Patel .................... H04L 1/0083
370/394

(Continued)

OTHER PUBLICATIONS

International Search Report and Written Opinion—PCT/US2016/053353—ISA/EPO—dated Feb. 15, 2017.

(Continued)

*Primary Examiner* — Faisal Choudhury
(74) *Attorney, Agent, or Firm* — Toler Law Group, P.C.

(57) ABSTRACT

A method of controlling frame transmissions includes determining, at a first device, a frame erasure rate for a communication session between the first device and at least a second device. The method also includes comparing the frame erasure rate to an erasure threshold. The method further includes discarding an active speech frame if the frame erasure rate satisfies the erasure threshold.

31 Claims, 6 Drawing Sheets

(51) Int. Cl.
*H04L 5/00* (2006.01)
*H04L 12/801* (2013.01)
*G10L 19/22* (2013.01)
*H04L 12/823* (2013.01)
*H04L 12/735* (2013.01)
*H04L 12/853* (2013.01)
*H04L 29/06* (2006.01)
*G10L 19/005* (2013.01)

(52) U.S. Cl.
CPC ...... *Y02D 70/1224* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/21* (2018.01); *Y02D 70/23* (2018.01); *Y02D 70/25* (2018.01)

(56) References Cited

U.S. PATENT DOCUMENTS

| | | | | |
|---|---|---|---|---|
| 2008/0095069 | A1* | 4/2008 | Thomas | H04M 3/2236 370/252 |
| 2008/0235389 | A1* | 9/2008 | Lindblom | G10L 19/167 709/231 |
| 2009/0177465 | A1* | 7/2009 | Johansson | G10L 19/24 704/219 |
| 2012/0028642 | A1* | 2/2012 | Schliwa-Bertling | C12N 5/0686 455/436 |
| 2013/0095748 | A1* | 4/2013 | Hu | H04L 1/0003 455/8 |
| 2015/0317977 | A1* | 11/2015 | Manjunath | G10L 17/00 704/270 |

OTHER PUBLICATIONS

Atti V., et al.,"Improved Error Resilience for Volte and VoIP with 3GPP EVS Channel Aware Coding," 2015 IEEE International Conference on Acoustics, Speech and Signal Processing (ICASSP), Apr. 1, 2015 (Apr. 1, 2015), pp. 5713-5717, XP055255936, DOI: 10.1109/ICASSP.2015.7179066 ISBN: 978-1-4673-6997-8.

Ikedo., "IP Applications for an Embedded Variable Bit-Rate Codec", International Telecommunication Union, Study Period 2001-2004, Oct. 15-25, 2002, pp. 1-4, XP017506011.

Johansson I., et.al., "Bandwidth Efficient Amr Operation for Voip", IEEE Workshop Proceedings, Piscataway, NJ, USA, Oct. 6, 2002, pp. 150-152, XP010647243.

Partial International Search Report—PCT/US2016/053353—ISA/EPO—dated Dec. 20, 2016.

* cited by examiner

POWER GAINS AND CAPACITY GAINS FOR A RELAXED FRAME ERASURE RATE

I. CROSS REFERENCE TO RELATED APPLICATIONS

The present application claims the benefit of U.S. Provisional Patent Application No. 62/244,142, entitled "IMPROVED POWER GAINS AND CAPACITY GAINS FOR A RELAXED FRAME ERASURE RATE," filed Oct. 20, 2015, which is expressly incorporated by reference herein in its entirety.

II. FIELD

The present disclosure is generally related to frame erasure rates.

III. DESCRIPTION OF RELATED ART

Advances in technology have resulted in smaller and more powerful computing devices. For example, there currently exist a variety of portable personal computing devices, including wireless telephones such as mobile and smart phones, tablets, and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

A source device may encode active frames (e.g., speech frames) and inactive frames at different bit-rates and send the encoded frames to a destination device. As a non-limiting example, according to the Third Generation Partnership Project (3GPP) Enhanced Voice Services (EVS) standard, active frames may be encoded at 13.2 kilobits per second (kbps) and inactive frames may be encoded at 2.4 kbps. A redundant copy (e.g., a partial copy) of a previous active frame (N–X) may be encoded and combined with a current active frame (N).

By attaching partial copies of previous frames to current frames, the number of active frames that are unaccounted for (e.g., the frame "erasure rate") at the destination device may be relatively low. Different standards may set different frame erasure rates for communication sessions (e.g., voice calls). As a non-limiting example, EVS channel aware mode may tolerate up to a ten percent frame erasure rate for a communication session between the source device and the destination device and still deliver the same voice quality as Adaptive Multi-Rate Wideband (AMR-WB) subject to two percent frame erasure rate (commercial grade HD voice services). If the frame erasure rate at the destination device is relatively low and is less than the tolerable frame erasure rate of the EVS channel aware mode frame rate, additional margin (in the form of dropped frames) may be introduced to improve communications while maintaining the same voice quality as AMR-WB at two percent frame erasure rate. As described below, the margin may be used to improve power gains at the source device and capacity gains of a system that includes the source device and the destination device.

IV. SUMMARY

According to one implementation of the techniques disclosed herein, a method of controlling frame transmissions includes determining, at a first device, a frame erasure rate for a communication session between the first device and at least a second device. The method also includes comparing the frame erasure rate to an erasure threshold. The method further includes discarding an active speech frame if the frame erasure rate satisfies the erasure threshold.

According to another implementation of the techniques disclosed herein, an apparatus includes a rate monitor configured to determine a frame erasure rate for a communication session between a first device and at least a second device. The apparatus also includes comparison circuitry configured to compare the frame erasure rate to an erasure threshold. The apparatus further includes active frame discard circuitry configured to discard an active speech frame if the frame erasure rate satisfies the erasure threshold.

According to another implementation of the techniques disclosed herein, a non-transitory computer-readable medium includes instructions for controlling transmissions. The instructions, when executed by a processor, cause the processor to perform operations including determining, at a first device, a frame erasure rate for a communication session between the first device and at least a second device. The operations also include comparing the frame erasure rate to an erasure threshold. The operations further include discarding an active speech frame if the frame erasure rate satisfies the erasure threshold.

According to another implementation of the techniques disclosed herein, an apparatus includes means for determining a frame erasure rate for a communication session between a first device and at least a second device. The apparatus also includes means for comparing the frame erasure rate to an erasure threshold and means for discarding an active speech frame if the frame erasure rate satisfies the erasure threshold.

According to another implementation of the techniques disclosed herein, a method of controlling a block error rate for a communication channel includes determining, at a particular device (e.g., a network device, a first device, or a second device), that a communication session between the first device and the second device supports an Enhanced Voice Services (EVS) coder/decoder (CODEC). The first device and the second device communicate via the communication channel. The method also includes increasing a block error rate for the communication channel in response to determining that the communication session supports the EVS CODEC. The EVS CODEC may support different modes. As a non-limiting example, the EVS CODEC may support EVS channel aware mode. As another non-limiting example, the EVS CODEC may support 13.2 kbps non-channel aware mode.

V. BRIEF DESCRIPTION OF THE DRAWINGS

VI. DETAILED DESCRIPTION

Figure 1:
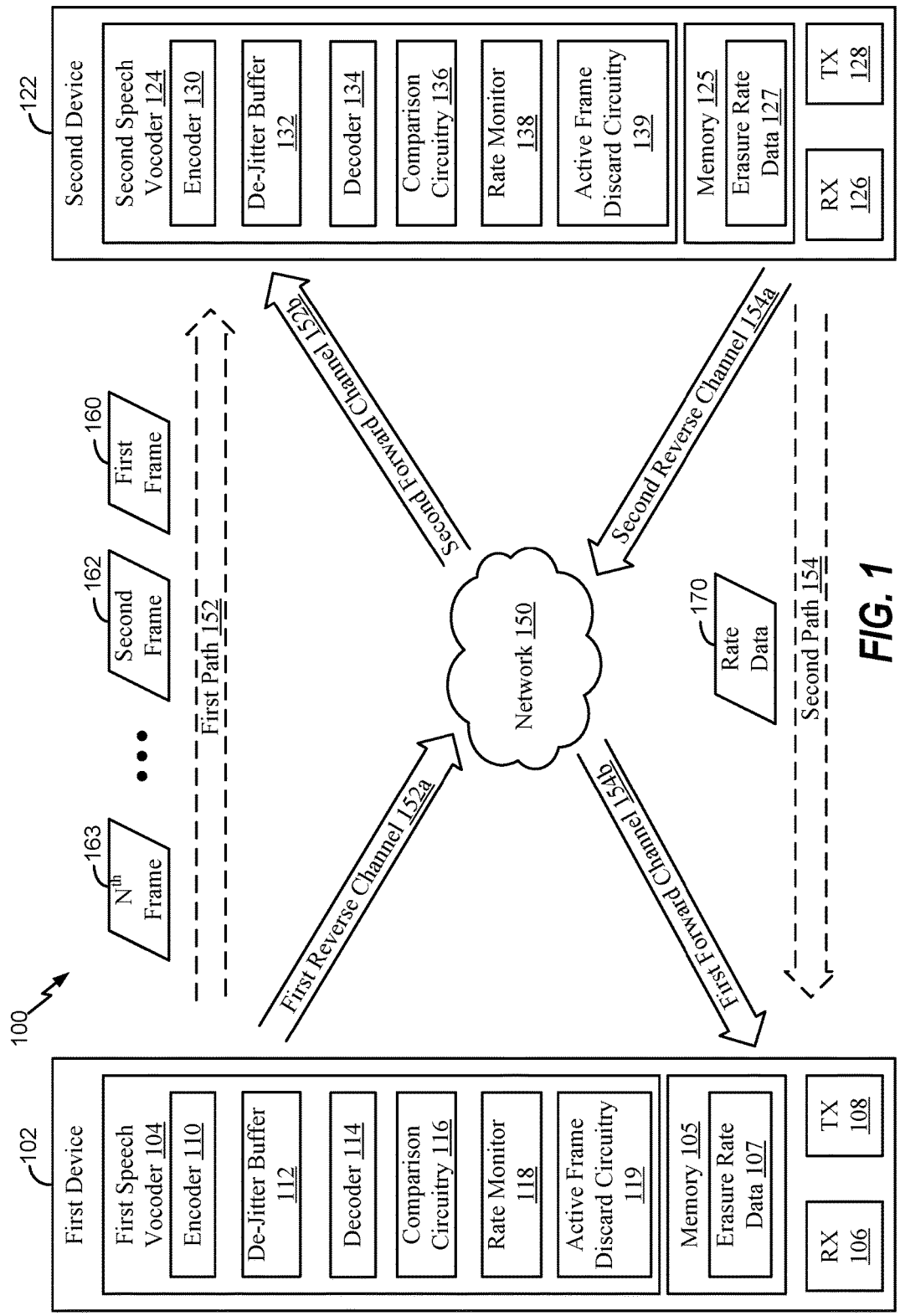
FIG. 1 is a block diagram of a particular illustrative implementation of a system that is operable to control frame transmissions.

As used herein, the term "device" refers to an electronic device that may be used for voice and/or data communication over a wireless communication network. Examples of devices include communication devices, cellular phones, personal digital assistants (PDAs), handheld devices, headsets, wireless modems, laptop computers, personal computers, etc. The devices described herein may be compatible with one or more mobile telecommunication technologies. For example, the devices described herein may be compatible with third generation (3G) mobile telecommunication technologies, fourth generation (4G) mobile telecommunication technologies, and/or fifth generation (5G) mobile telecommunication technologies. Additionally, or in the alternative, the devices described herein may be compatible with different standards (e.g., a Long-Term Evolution (LTE) wireless communication standard, a LTE advanced (LTE-A) wireless communication standard, a Worldwide Interoperability for Microwave Access (WiMAX) wireless communication standard, an Enhanced Voice Services (EVS) standard, an Adaptive Multi-Rate Wideband (AMR-WB) standard, an LTE-direct (LDE-D) wireless communication standard, etc.).

The average voice activity per user in a typical two-way conversation may be relatively low. As an illustrative example, fifty to sixty percent of the time a user may be speaking, and the remaining time may correspond to user silence. Active speech may be encoded at a relatively high bit-rate (e.g., 12.2 kbps for AMR and 13.2 kbps for EVS), and inactive frames or background noise may be encoded using discontinuous transmissions (DTX) at relatively low bit-rates (e.g., 2 kbps). In a full-duplex two-way conversation, use of DTX may provide power savings by either transmitting low rate packets (Silence Descriptor or SID frames) during voice inactivity or skipping transmission for NO_DATA or blank frames. In addition, the active time for a terminal to transmit packets may be reduced based on the voice activity. If the average voice activity at a first terminal is sixty percent, then the transmit power at the first terminal may be potentially reduced by roughly forty percent. As used herein, the "transmit power" or "transmission power" may refer to a time-averaged transmission power, a total transmission power, or an instantaneous transmission power.

"Link budget" may correspond to the maximum path-loss at which a communication link between the source device and the destination device satisfy a block error rate (BLER) for a target data rate. The BLER may be expressed as the ratio of the number of erroneous transport blocks to the total number of received transport blocks at the destination device. The communication link may be sustained with a relatively high path loss in EVS channel aware mode, which in turn, may result in a higher link budget.

Additionally, in a Voice-Over Long-Term Evolution (VoLTE) system, a signal-to-noise ratio (SNR) at the destination device may be lowered by lowering the transmit power at the source device. For a fixed maximum transmit power, coverage and user equipment (UE) power savings may be realized by moving an edge of a cell outwards due to the increased power headroom. Alternatively, the source device may maintain a relatively high transmit power and voice quality in poor coverage areas may be improved.

The packet loss rate may also be increased by not transmitting (e.g., discarding) the packet at the first device (e.g., the transmitting device). In this scenario, the power at which the packets are transmitted would not be lowered; however, power savings may be achieved at the first device due to the reduced active time and/or due to the reduced number of transmissions. Thus, power savings may be achieved by dropping active speech packets using DTX during periods of active speech.

In case of congestion and/or bad channel conditions (e.g., greater than 2 percent BLER), the network/gateway/receiving terminal may request the transmitting terminal to transmit redundant packets for decoding in case the original packets do not arrive (or arrive late) at the network/gateway/receiving terminal. Full packet redundancy transmission may increase the effective network bandwidth. While the speech quality may be improved due to the availability of redundant packets, the end-to-end latency may increase along with an increase in transmission power due to full-redundancy transmissions. Another alternative may be to not change the effective network bandwidth and reduce the encoding bit-rate. For example, the bit-rate for EVS may be reduced from 13.2 kbps to 7.2 kbps in order to accommodate one-hundred percent full packet redundancy transmission. However, the reduced bit-rate may have a reduce speech quality.

The EVS channel aware mode operates using a constant bit-rate channel (e.g., 13.2 kbps bit-rate channel). A redundant copy of a previous packet may be a partial copy of the previous packet, and the redundant copy of the previous packet may be transmitted for critical speech frames (e.g., frames that may cause a significant quality impact at a receiver if lost). The primary frame bit-rate may be reduced (e.g., to 9.6 kbps) to accommodate the redundant copy (e.g., 3.6 kbps) such that the combination of the primary and redundant frame fits in the constant bit-rate channel. The bit-rate reduction of the primary frame may be performed in a source controlled manner (depending on the characteristics of the input speech) to ensure reduced impact on the overall speech quality.

The techniques described herein disclose selectively dropping certain packets at the encoder of the transmitting terminal. For example, the transmitting terminal may discard (e.g., not transmit) certain packets and may introduce frame erasure at the encoder and may send a partial copy of the un-transmitted packets in a future frame. Using the partial redundant copy of the un-transmitted packets, the receiving terminal may reconstruct the frame that is not transmitted by the transmitting terminal. The transmitting terminal may selectively transmit packets based on source signal characteristics and a target drop rate, as described in further detail with respect to FIG. 2A, or based on target "on" time. Alternatively, the transmitting terminal may not transmit packets at fixed intervals.

In a two-way conversation or in a multi-party conference, the participating terminals (e.g., user devices or user equipment) may operate in full-duplex mode and power savings due to selective transmission of encoder packets in the presence of partial redundancy may reduce the transmit power. In a device-to-device (D2D) push-to-talk (PTT) group communication, users may communicate one at a time in a half-duplex mode. In such a scenario, when partial redundancy is supported, in order to reduce the uplink transmit power, the transmitting terminal may selectively not transmit a first frame to a first group of participants, not transmit a second frame to a second group of participants, not transmit a third frame to a third group of participants, etc. Alternatively, the terminal may not transmit at regular intervals when transmitting to all N−1 participants.

The techniques described herein may also be applied at an enodeB/network side to realize power savings due to reduced "on" time. Capacity gains (in terms of number of users per cell) may also be realized on the network due to a reduced average resource block (RB) consumption. Capacity gains may be realized in a Voice-Over Long-Term Evolution (VoLTE) system via relaxed dynamic scheduler delay requirements (e.g., enodeB grants may be reduced by a factor of the "on" time reduction) thereby freeing up resources to add more users or for other applications. Thus, although the techniques described herein are generally performed at a user equipment (UE), it should be appreciated that the techniques may also be performed at a network level (e.g., at the enodeB) to realize downlink capacity gains. Uplink capacity gains may be realized if the techniques are performed at the UE.

A channel aware mode of the EVS standard may tolerate up to ten percent frame error rate (FER) and deliver substantially the same voice quality as AMR-WB at two percent FER. Thus, a transmitting terminal by discard (e.g., "blank") up to ten percent of active frame packets at the encoder.

The packet drop rate (e.g., the packet drop percentage) or "on" time may be a function of target capacity gains or of target power reduction. The target capacity gains and/or the target power reduction may be determined at the UE or may be determined at the network level and communicated to the UE. Upon learning the channel conditions (e.g., in a high-FER scenario), the encoder may not drop any packets in order to not introduce quality artifacts. Alternatively, upon learning the channel FER or effective BLER, the encoder may determine a percentage of packets to drop (or a target "on" time) and selectively transmit packets such that the voice quality is maintained at a particular level, for example AMR-WB at 2% frame erasure rate The techniques described herein may be applicable to multi-unicast uplink transmission in an off-network D2D PTT session to reduce transmission uplink power, unicast two-way or multi-unicast off-network to reduce transmission uplink power, unicast two-way conversations to increase network coverage, unicast two-way conversations to increase capacity efficiency (e.g., the number of users able to participate in a communication session), or a combination thereof.

Referring to FIG. 1, a system 100 that is operable to control frame transmissions is shown. The system 100 includes a first device 102 in communication with one or more other devices (e.g., a second device 122) via a network 150. The first device 102 may send data to the second device 122 via the network 150 using a first path 152, and the second device 122 may send data to the first device 102 via the network 150 using a second path 154.

The first device 102 may communicate with the network 150 via a first reverse channel 152a (e.g., a first reverse link) and a first forward channel 154b (e.g., a first forward link). For example, the first device 102 may transmit data to the network 150 using the first reverse channel 152a, and the first device 102 may receive data from the network 150 using the first forward channel 154b. The second device 122 may communicate with the network 150 via a second reverse channel 154a (e.g., a second reverse link) and a second forward channel 152b (e.g., a second forward link). For example, the second device 122 may transmit data to the network 150 using the second reverse channel 154a, and the second device 122 may receive data from the network 150 using the second forward channel 152b.

The network 150 may include one or more base stations or access points to communicate data between the first device 102 and the second device 122. As used herein, data (e.g., packets, frames, offset values, acknowledgements, etc.) communicated via the first path 152 corresponds to data transmitted from the first device 102 to the network 150 via the first reverse channel 152a and received at the second device 122 from the network 150 via the second forward channel 152b. In a similar manner, data communicated via the second path 154 corresponds to data transmitted from the second device 122 to the network 150 via the second reverse channel 154a and received at the first device 102 from the network 150 via the first forward channel 154b.

The devices 102, 122 may include fewer or more components than illustrated in FIG. 1. For example, the devices 102, 122 may include one or more processors, one or more memory units, or both. In a particular illustrative implementation, the first device 102 and/or the second device 122 may be a smart phone, a cellular phone, a mobile communication device, a tablet, a PDA, or a combination thereof. Such devices may include a user interface (e.g., a touch screen, voice recognition capability, or other user interface capabilities).

The first device 102 includes a first speech vocoder 104, a memory 105, a receiver (RX) 106, and a transmitter (TX) 108. The first speech vocoder 104 includes an encoder 110, a de jitter buffer 112, a decoder 114, comparison circuitry 116, a rate monitor 118, and active frame discard circuitry 119. The second device 122 includes a second speech vocoder 124, a memory 125, a receiver (RX) 126, and a transmitter (TX) 128. The second speech vocoder 124 includes an encoder 130, a de-jitter buffer 132, a decoder 134, comparison circuitry 136, a rate monitor 138, and active frame discard circuitry 139.

In the example illustrated in FIG. 1, the first device 102 is a "transmitting terminal" and the second device 122 is a "receiving terminal." For example, the first device 102 may transmit frames that are received by the second device 122. However, in other implementations, each device 102, 122 may concurrently operate as a receiving terminal and a transmitting terminal. For example, the first device 102 may transmit frames to the second device 122 via the first path 152 (e.g., transmit frames to the network 150 via the first reverse channel 152a) and concurrently receive frames from the second device 122 via the second path 154 (e.g., receive frames from the network 150 via the first forward channel 154b). Additionally, the second device 122 may transmit frames to the first device 102 via the second path 154 (e.g., transmit frames to the network 150 via the second reverse channel 154a) and concurrently receive frames from the first device 102 via the first path 152 (e.g., receive frames from the network 150 via the second forward channel 152b).

The encoder 110 of the first speech vocoder 104 may encode data in frames that are scheduled for transmission to the second device 122 during a communication session (e.g., a voice call). For example, the encoder 110 may encode a first frame 160, a second frame 162, an Nth frame 163, etc. According to one implementation, N may be an integer value that is greater than one. For example, if N is equal to forty-five, the encoder 110 may encode forty-five frames that are scheduled for transmission to the second device 122 during the communication session. Each frame 160, 162, 163 may be classified as an active frame (e.g., an active speech frame) or an inactive frame. As used herein, an active frame may include or correspond to a frame that is not determined to be inactive by a voice activity detector. As a non-limiting example, an active frame may include a frame that includes higher audio levels associated with speech as compared to audio levels associated with background noise.

According to one implementation, active frames may be encoded at 13.2 kbps and inactive frames may be encoded at 2 kbps. According to another implementation, active frames may be encoded at a bit-rate within a range from 2.8 kbps to 128 kbps. As used herein, an inactive frame may include or correspond to a frame that is determined to be inactive by a voice activity detector. As a non-limiting example, an inactive frame may include a frame that includes higher audio levels associated with background noise as compared to audio levels associated with speech.

Certain frames may include redundancy information (e.g., a partial copy) of previous frames. For example, a redundant copy of a previous active frame may be encoded and combined with a current active frame. To illustrate, the first frame 160 and the Nth frame 163 may be active frames, the first frame 160 may be encoded at a first time, and the Nth frame 163 may be encoded at a second time that is after the first time. The Nth frame 163 (e.g., the current frame) may include a partial copy of the first frame 160 (e.g., a previous frame) such that if the first frame 160 is lost during transmission, the decoder 134 of the second device 122 may fetch the Nth frame 163 from the de jitter buffer 132 and decode the partial copy of the first frame 160 to recover speech associated with the first frame 160. According to one implementation, the current frame (e.g., the primary frame) bit-rate may be reduced to 9.6 kbps and the redundant copy of the previous frame may be encoded at 3.6 kbps such that the total bit-rate is equal to 13.2 kbps.

The first device 102 may be configured to determine an erasure threshold (e.g., an allowable frame erasure rate) for the communication session between the first device 102 and the second device 122. As used herein, the "erasure threshold" corresponds to a rate of dropped active frames (or lost active frames) to be satisfied in order to maintain the communication session or in order to maintain the communication session at a relatively high quality. As a non-limiting example, if the erasure threshold is equal to ten percent, nine out of every ten active frames encoded by the encoder 110 of the first device 102 may be accounted for by the decoder 134 at the second device 122 in order to maintain the communication session or in order to maintain the communication session at a relatively high quality.

According to some implementations, the erasure threshold may be determined at the network level (e.g., determined at an enodeB (not shown)) and may be communicated to the first device 102 via the network 150. According to other implementations, the erasure threshold may be specified by a standard. For example, the channel aware mode of the EVS standard may tolerate up to a ten percent frame erasure rate in order to maintain a communication session between the first device 102 and the second device 122 or in order to maintain the communication session at a relatively high quality for example the same voice quality as AMR-WB at 2% FER. As another example, the AMR-WB standard may tolerate up to a two percent frame erasure rate in order to maintain a communication session between the first device 102 and the second device 122 or in order to maintain the communication session at a relatively high quality. The memory 105 may store erasure rate data 107 that indicates the allowable frame erasure rate. The first speech vocoder 104 may retrieve the erasure rate data 107 from the memory 105 to determine the erasure threshold. For purposes of the following description, the erasure threshold is assumed to be equal to ten percent in compliance with the EVS channel aware mode. However, it should be understood ten percent is merely an illustrative non-limiting example and should in no ways be viewed as limiting.

The first device 102 may also be configured to determine a frame erasure rate for the communication session. The frame erasure rate may also be referred to as the "Real-time Transport Protocol (RTP) loss rate". The RTP loss rate may be the percentage of lost RTP packets during the communication session. To illustrate, the rate monitor 138 of the second device 122 may monitor the rate of unaccounted for active frames at the second device 122. The rate monitor 138 may determine the rate at which active frames are lost or dropped during transmission (e.g., determine the "frame erasure rate"). Channel conditions may affect the frame erasure rate. For example, relatively bad channel conditions (e.g., low throughput, channel congestion, etc.) may increase the frame erasure rate. According to some implementations, the frame erasure rate may correspond to an average number of unaccounted for active frames over a time period or may correspond to an average number of active frames that did not reach the receiver over a time period. The time period may be relatively short (e.g., less one second) to determine an "instantaneous" frame erasure rate. The time period may be longer (e.g., greater than one second) to determine an "average" frame erasure rate.

As described above, a current frame may include redundancy information (e.g., a partial copy) of a previous frame. Thus, if a previous frame is lost during transmission, the decoder 134 may reconstruct the previous frame using the redundancy information of the current frame. Using redundancy information to reconstruct frames lost during transmission may reduce the effective frame error rate. For example, if the first frame 160 is lost during transmission and the Nth frame 163 includes a partial copy of the first frame 160, the decoder 134 may reconstruct the first frame 160 using the Nth frame 163, and the first frame 160 may not be considered "lost" for purposes related to the effective frame error rate. After determining the frame erasure rate (e.g., the RTP loss rate) at the rate monitor 138, the transmitter 128 of the second device 122 may transmit rate data 170 indicative of the frame erasure rate (e.g., the RTP loss rate) to the receiver 106 of the first device 102.

The first device 102 may further be configured to compare the frame erasure rate to the erasure threshold. For example, the comparison circuitry 116 may compare the frame erasure rate received from the second device 122 to the erasure threshold indicated by the erasure rate data 107. Based on the comparison, the first speech vocoder 104 may determine whether to discard an active speech frame that would otherwise be transmitted to the second device 122. For example, if the frame erasure rate is greater than the erasure threshold, the first speech vocoder 104 may transmit additional active speech frames (or additional redundancy information) to reduce the frame erasure rate. According to certain implementations, the communication session may end (based on factors such as poor signal quality) or have a reduced quality if the frame erasure rate is greater than the erasure threshold. However, if the frame erasure rate is lower than the erasure threshold, the active frame discard circuitry 119 may discard an active speech frame that would otherwise be transmitted to the second device 122. Discarding an active speech frame (e.g., not transmitting the active speech frame) may conserve transmission power at the first device 102. The active frame discard circuitry 119 (or other circuitry within the speech vocoder 104) may determine which active frame(s) to drop based on techniques described with respect to FIG. 2A.

The system 100 of FIG. 1 may enable the first device 102 to conserve battery power by discarding active speech frames when the frame erasure rate is lower than the erasure threshold. For example, by discarding active speech frames (instead of transmitting the active speech frames) when the frame erasure rate is lower than the erasure threshold, battery drainage associated with the transmitter 108 may be reduced while the communication session between the first device 102 and the second device 122. Discarding active speech frames may also increase network capacity (e.g., a number of users per cell site).

Figure 2A:
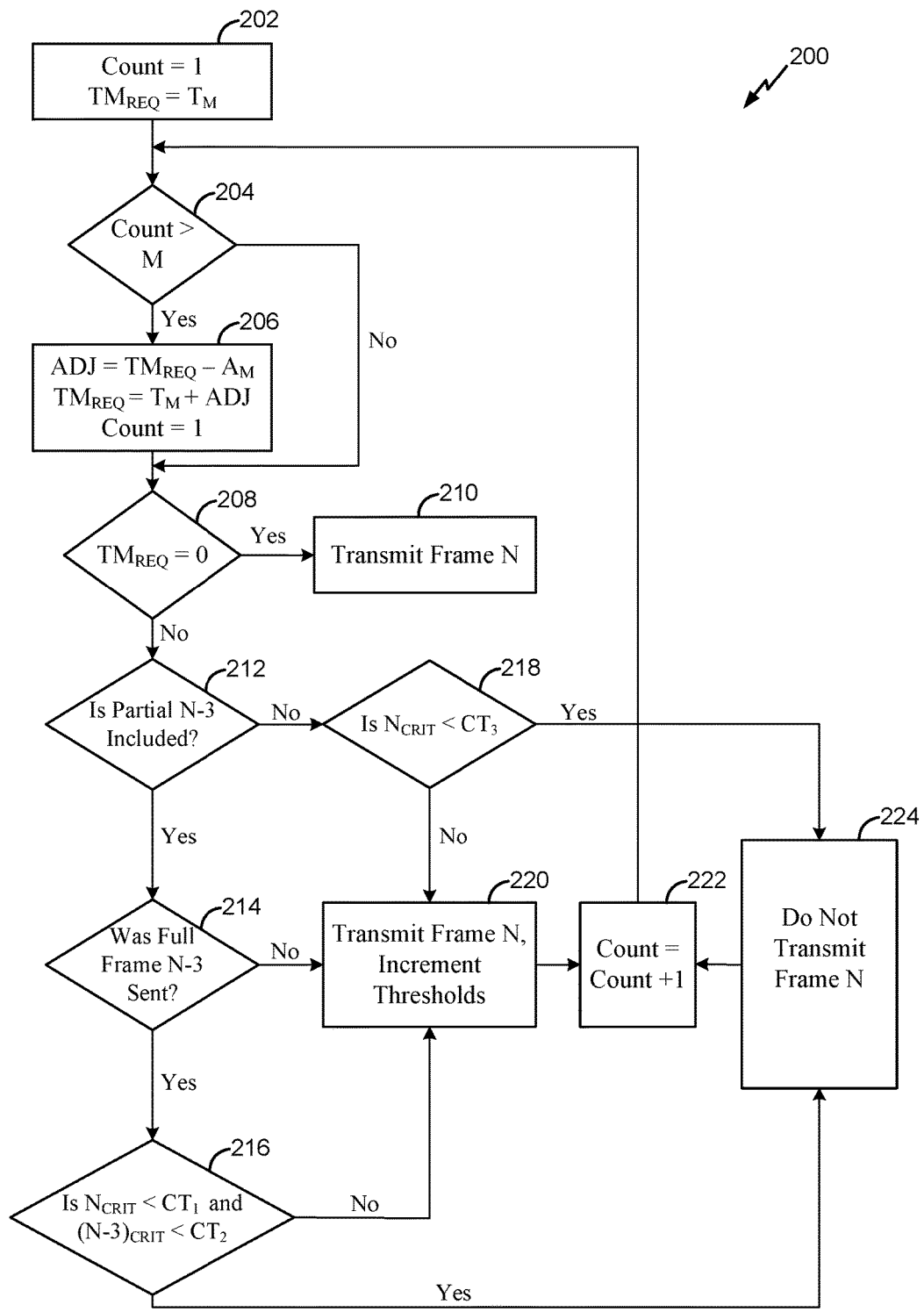
FIG. 2A is a flowchart of a particular implementation of a process for controlling frame transmissions.

Referring to FIG. 2A, a flowchart of a particular implementation of a process 200 for controlling frame transmissions is shown. The process 200 may be performed by the components of the first speech vocoder 104 of FIG. 1, the components of the second speech vocoder 124 of FIG. 1, or a combination thereof. As described herein, the process 200 may represent logic used by the first speech vocoder 104 to select particular frames to transmit to the second device 122.

At 202, the first speech vocoder 104 may initialize a frame count to one and may set a target reduction count over M frames ($T_M$) equal to a required reduction count ($TM_{REQ}$). The required reduction count ($TM_{REQ}$) may correspond to the number of frames to be dropped in order to achieve the target reduction (T). At 204, the first speech vocoder 104 may determine whether the frame count is greater than M, where M is a number of frames in a particular transmission window. According to one implementation, M may be randomly determined at the speech vocoder 104. If the frame count is greater than M, at 206, the first speech vocoder 104 may set an adjustment value (ADJ) equal to the difference between the required reduction count ($TM_{REQ}$) and an actual reduction count achieved over M frames ($A_M$) (e.g., ADJ=$TM_{REQ}$-$A_M$). After setting the adjustment value, the first speech vocoder 104 may modify the required reduction count ($TM_{REQ}$) to correspond to the sum of the target reduction count over M frames ($T_M$) and the adjustment value (ADJ) (e.g., $TM_{REQ}$=$T_M$+ADJ). The first speech vocoder 104 may also reset the frame count to one.

If the frame count is not greater than M, at 206, the first speech vocoder 104 may determine whether the required reduction count ($TM_{REQ}$) is equal to zero, at 208. If the required reduction count ($TM_{REQ}$) is equal to zero, at 208, the first speech vocoder 104 may initiate transmission of a current frame (N), at 210. For example, the encoder 110 may encode data in the current frame (N), and the transmitter 108 may transmit the current frame (N) to the second device 122 via the first path 152. If the required reduction count ($TM_{REQ}$) is not equal to zero, at 208, the first speech vocoder 104 may determine whether a partial copy of a previous frame (N-3) is included with (e.g., attached to) the current frame (N), at 212. According to the process diagram 200, a forward error correction (FEC) offset may be equal to three such that a current frame may include redundancy information of a previously sent frame having a sequence number that is offset from a sequence number of the current frame by three. The first speech vocoder 104 may determine whether a partial copy of the previous frame (N-3) is included with the current frame (N) based on the FEC offset. For example, if the offset between the previous frame (N-3) and the current frame (N) is equal to the FEC offset, then the first speech vocoder 104 may determine that the partial copy of the previous frame (N-3) is included with the current frame (N). It should be understood that the FEC offset depicted in the process 200 is merely an illustrative non-limiting example and should not be construed as limiting.

If the partial copy of the previous frame (N-3) is included with the current frame (N), at 212, the first speech vocoder 104 may determine whether a full copy of the previous frame (N-3) was sent to the second device 122, at 214. For example, the first speech vocoder 104 may determine that the full copy of the previous frame (N-3) was sent to the second device 122 if the first speech vocoder 104 did not issue a command to discard the previous frame (N-3). If a full copy of the previous frame (N-3) was sent to the second device 122, at 214, the first speech vocoder 104 may compare a criticality value ($N_{CRIT}$) of the current frame (N) to a first threshold ($CT_1$) and may compare a criticality value ($(N-3)_{CRIT}$) of the previous frame (N-3) to a second threshold ($CT_2$), at 216. As used herein, a "criticality value" indicates a level of speech in a particular frame. For example, if a frame has a relatively high criticality value, the frame may include a lot of speech and may be of relatively high importance. If a frame has a low criticality value, the frame may include a lot of background noise and may be of relatively little importance. If the criticality value ($N_{CRIT}$) is less than the first threshold ($CT_1$) and the criticality value ($(N-3)_{CRIT}$) is less than the second threshold ($CT_2$), the first speech vocoder 104 may discard the current frame (N), at 224. If the criticality value ($N_{CRIT}$) is not less than the first threshold ($CT_1$) or the criticality value ($(N-3)_{CRIT}$) is not less than the second threshold ($CT_2$), the first speech vocoder 104 may initiate transmission of the current frame (N), at 220, and may increment the thresholds ($CT_1$, $CT_2$) to reduce the number of frames transmitted. For example, the higher the thresholds ($CT_1$, $CT_2$), the fewer frames that are transmitted to the second device 122. The thresholds ($CT_1$, $CT_2$) may be initialized and adjusted by the first speech vocoder 104. Initialization of the thresholds ($CT_1$, $CT_2$) may be performed based on characteristics of an audio source. For example, clean speech may be initialized to a first set of thresholds, noisy speech may be initialized to a second set of thresholds, music may be initialized to a third set of thresholds, etc. After the transmitting the current frame (N), the first speech vocoder 104 may increment the frame count by one, at 222.

If a full copy of the previous frame (N-3) was not sent to the second device 122, at 214, the first speech vocoder 104 may initiate transmission of the current frame (N), at 220, and may increment the thresholds ($CT_1$, $CT_2$). After the transmitting the current frame (N), the first speech vocoder 104 may increment the frame count by one, at 222. If the partial copy of the previous frame (N-3) is not included with the current frame (N), at 212, the first speech vocoder 104 may compare the criticality value ($N_{CRIT}$) of the current frame (N) to a third threshold ($CT_3$), at 218. If the criticality value ($N_{CRIT}$) is not less than the third threshold ($CT_3$), the first speech vocoder 104 may initiate transmission of the current frame (N), at 220, and may increment the thresholds ($CT_1$, $CT_2$, $CT_3$) to reduce the number of frames transmitted. If the criticality value ($N_{CRIT}$) is less than the third threshold ($CT_3$), the first speech vocoder 104 may discard the current frame (N), at 224.

Thus, the process 200 of FIG. 2A may enable the first speech vocoder 104 to select active frames to discard when the frame erasure rate is lower than the erasure threshold. According to the process 200, a relatively large number of frames may be discarded if the thresholds ($CT_1$, $CT_2$, $CT_3$) are relatively high. According to one implementation, the first and second threshold ($CT_1$, $CT_2$) may be lower than the third threshold ($CT_3$). The third threshold ($CT_3$) may be incremented more often than the first and second thresholds ($CT_1$, $CT_2$) to discard more number of frames where the partial copy of the previous frame (N-3) is not included with the current frame (N).

Figure 2B:
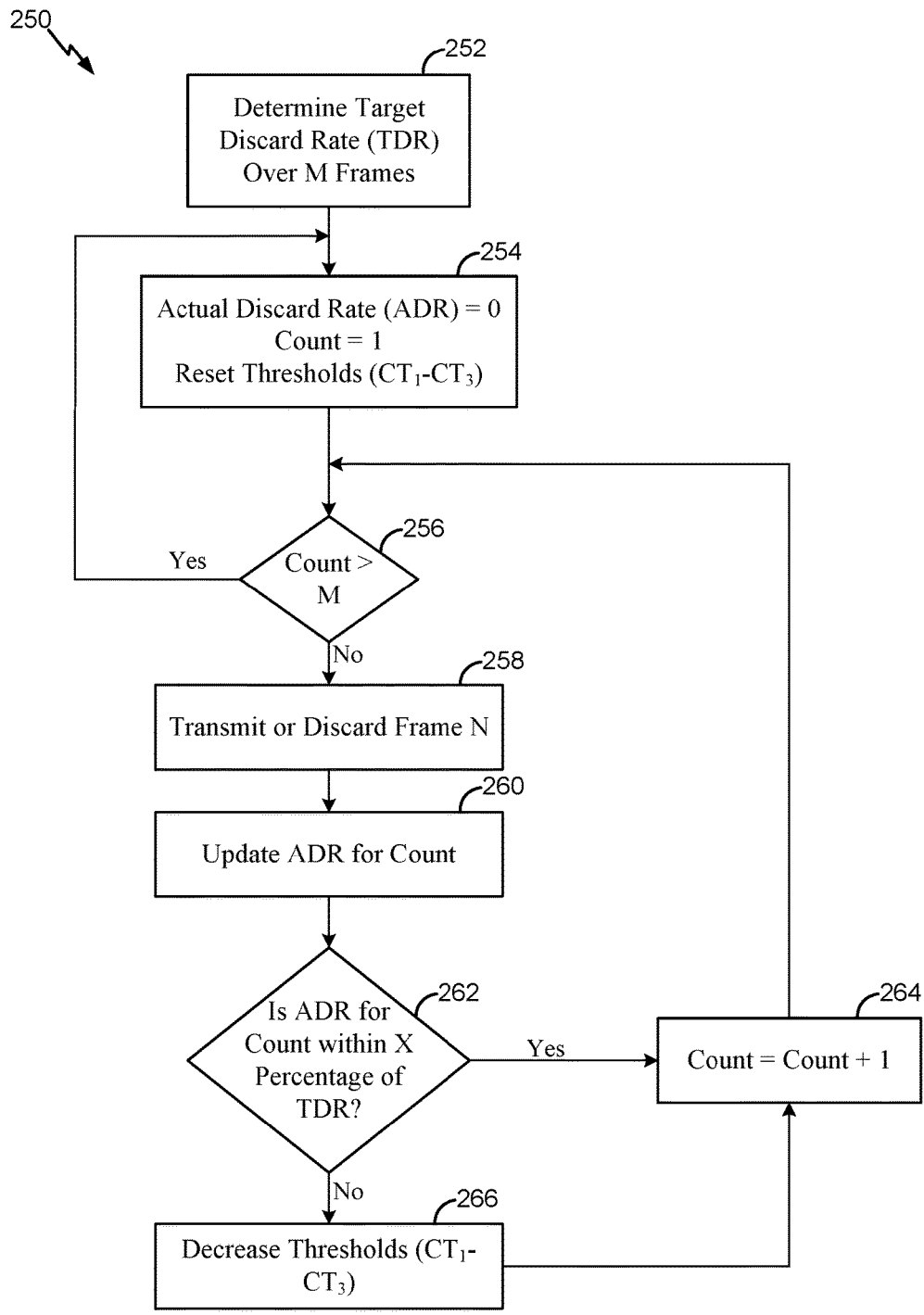
FIG. 2B is a flowchart of another particular implementation of a process for controlling frame transmissions.

Referring to FIG. 2B, a flowchart of a particular implementation of a process 250 for controlling frame transmissions is shown. The process 250 may be performed by the components of the first speech vocoder 104 of FIG. 1, the components of the second speech vocoder 124 of FIG. 1, or a combination thereof. As described herein, the process 250 may represent logic used by the first speech vocoder 104 to select particular frames to transmit to the second device 122. The process 250 may be implemented in conjunction with the process 200 of FIG. 2A.

At 252, the first speech vocoder 104 may determine a target discard rate (TDR) over the M frames. The target discard rate (TDR) may correspond to the number of frames that may be discarded for every M frames. As a non-limiting example, if the target discard rate (TDR) is equal to ten percent and M is equal to one hundred, then ten frames out of the one hundred frames may be discarded by the first speech vocoder 104. As described below, the process 250 may provide mechanisms to spread the ten frames out over the course of the one hundred frames by selectively decreasing the thresholds ($CT_1$, $CT_2$, $CT_3$) described with respect to FIG. 2A.

After determining the target discard rate (TDR), the first speech vocoder 104 may set (or reset) an actual discard rate (ADR) to zero and may set the frame count to one, at 254. Additionally, the first speech vocoder 104 may set (or reset) the thresholds ($CT_1$, $CT_2$, $CT_3$) to the initial values, as described with respect to the process 200 of FIG. 2A. If the frame count is greater than M, at 256, the first speech vocoder 104 may reset the actual discard rate (ADR) back to zero and may reset the frame count to back to one, at 254. Alternatively, if the frame count is not greater than M, at 256, the first speech vocoder 104 may transmit or discard the current frame (N), at 258, based on the techniques described with respect to the process 200 of FIG. 2.

At 260, the first speech vocoder 104 may update the actual discard rate (ADR) for the frame count. As a non-limiting example, if two frames have been discarded and the current frame count is ten (e.g., count=10), then the first speech vocoder 104 may update the actual discard rate (ADR) to twenty percent. At 262, the first speech vocoder 104 may determine whether the actual discard rate (ADR) is within a particular percentage (X) of the target discard rate (TDR). As a non-limiting example, the target discard rate (TDR) may be ten percent and the particular percentage (X) may be five percent. In this example, if the actual discard rate (ADR) is between five percent and fifteen percent, then the first speech vocoder 104 may determine that the actual discard rate (ADR) is within the particular percentage (X) of the target discard rate (TDR).

If the actual discard rate (ADR) is not within the particular percentage of the target discard rate (TDR), at 262, then the first speech vocoder 104 may decrease the thresholds ($CT_1$, $CT_2$, $CT_3$), at 266. As described with respect to FIG. 2A, decreasing the thresholds ($CT_1$, $CT_2$, $CT_3$) may result in the first speech vocoder 104 discarding fewer frames. Thus, decreasing the thresholds ($CT_1$, $CT_2$, $CT_3$) may result in a spreading the discarded frames over the M frames as opposed to discarding a relatively high number of frames at first and discarding a relatively low number of frames as the frame count approaches M. After decreasing the thresholds ($CT_1$, $CT_2$, $CT_3$), at 266, the first speech vocoder 104 may increment the frame count by one, at 264. If the actual discard rate (ADR) is within the particular percentage of the target discard rate (TDR), at 262, then the first speech vocoder 104 may bypass adjusting the thresholds ($CT_1$, $CT_2$, $CT_3$) and may increment the frame count by one, at 264.

The process 250 of FIG. 2B may implement techniques to spread the discarded frames over the M frames as opposed to discarding a relatively high number of frames at first and discarding a relatively low number of frames as the frame count approaches M. Distributing the discarded frames over the M frames preserve audio quality by reducing scenarios where the frame dropping is clustered. For example if the target discard rate (TDR) is ten percent and M is one hundred, the techniques of FIG. 2B may provide mechanisms such that the ten frames to be discard are spread out and are not all discarded consecutively or within a small time window.

Figure 3A:
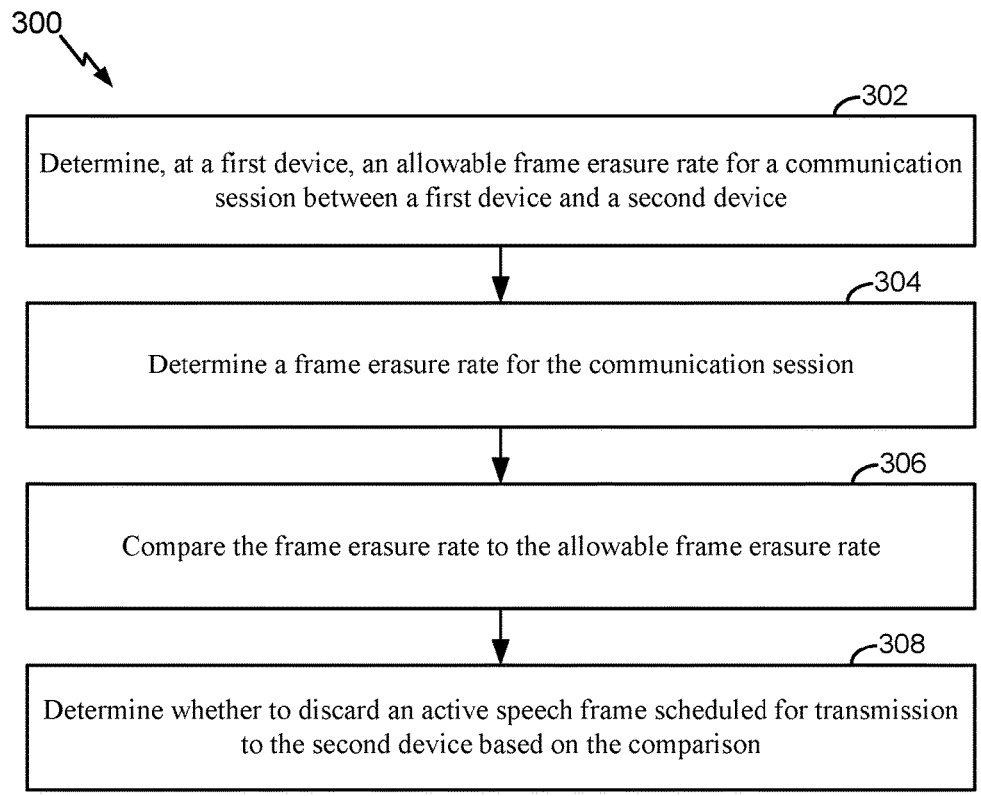
FIG. 3A is a flowchart of a method for controlling frame transmissions.

Referring to FIG. 3A, a particular implementation of a method 300 for controlling frame transmissions is shown. The method 300 may be performed by the components within the first device 102 of FIG. 1, the second device 122 of FIG. 1, or any combination thereof.

The method 300 includes determining, at a first device, an allowable frame erasure rate (e.g., an erasure threshold) for a communication session between the first device and a second device, at 302. For example, referring to FIG. 1, the first device 102 may to determine the erasure threshold for the communication session between the first device 102 and the second device 122. The erasure threshold may be specified by a standard. For example, the channel aware mode of the EVS standard may tolerate up to a ten percent frame erasure rate to maintain a communication session between the first device 102 and the second device 122. As another example, the AMR-WB standard may tolerate up to a two percent frame erasure rate to maintain a communication session between the first device 102 and the second device 122. The memory 105 may store erasure rate data 107 that indicates the erasure threshold. The first speech vocoder 104 may retrieve the erasure rate data 107 from the memory 105 to determine the erasure threshold.

A frame erasure rate for the communication session may be determined, at 304. For example, referring to FIG. 1, the first device 102 may determine the frame erasure rate for the communication session. For example, the rate monitor 138 of the second device 122 may monitor the rate of unaccounted for active frames at the second device 122. For example, the rate monitor 138 may determine the rate at which active frames are lost or dropped during transmission. Upon determining the frame erasure rate at the rate monitor 138, the transmitter 128 of the second device 122 may transmit the rate data 170 indicative of the frame erasure rate to the receiver 106 of the first device 102.

The frame erasure rate may be compared to the allowable frame erasure rate, at 306. For example, referring to FIG. 1, the first device 102 may compare the frame erasure rate to the erasure threshold. For example, the comparison circuitry 116 may compare the frame erasure rate received from the second device 122 to the erasure threshold indicated by the erasure rate data 107.

The method 300 may further include determining whether to discard an active speech frame scheduled for transmission to the second device based on the comparison, at 308. For example, referring to FIG. 1, based on the comparison, the first speech vocoder 104 may determine whether to discard an active speech frame scheduled for transmission to the second device 122. For example, if the frame erasure rate is not lower than the erasure threshold, the first speech vocoder 104 may transmit additional active speech frames (or additional redundancy information) to reduce the frame erasure rate. According to certain implementations, the communication session may end if the frame erasure rate is not lower than the erasure threshold. However, if the frame erasure rate is lower than the erasure threshold, the first speech vocoder 104 may discard an active speech frame scheduled for transmission to the second device 122. Discarding an active speech frame (e.g., not transmitting the active speech frame) may conserve transmission power at the first device 102.

According to one implementation, the method 300 may include determining whether to discard a particular active speech frame if the frame erasure rate is lower than the erasure threshold. Determining whether to discard the particular active speech frame may include determining if the particular active speech frame includes a partial copy of a previous frame.

In response to determining that the particular active speech frame includes the partial copy of the previous frame, the method 300 may include determining whether the previous frame was transmitted to the second device. If the previous frame was not transmitted to the second device, the method 300 may include transmitting the particular active speech frame to the second device. If the previous frame was transmitted to the second device, the method 300 may include comparing a first criticality value of the particular active speech frame to a first threshold and comparing a second criticality value of the previous frame to a second threshold. If the first criticality value is not less than the first threshold or if the second criticality value is not less than the second threshold, the method 300 may include transmitting the particular active speech frame to the second device. If the first criticality value is less than the first threshold and the second criticality value is less than the second threshold, the method 300 may include discarding the particular active speech frame.

In response to determining that the particular active speech frame does not include the partial copy of the previous frame, the method 300 may include determining whether the first criticality value of the particular active speech frame is less than a third threshold. The method 300 may include transmitting the particular active speech frame to the second device if the first criticality value is not less than the third threshold. The method 300 may also include discarding the particular active speech frame if the first criticality value is less than the third threshold.

Figure 3B:
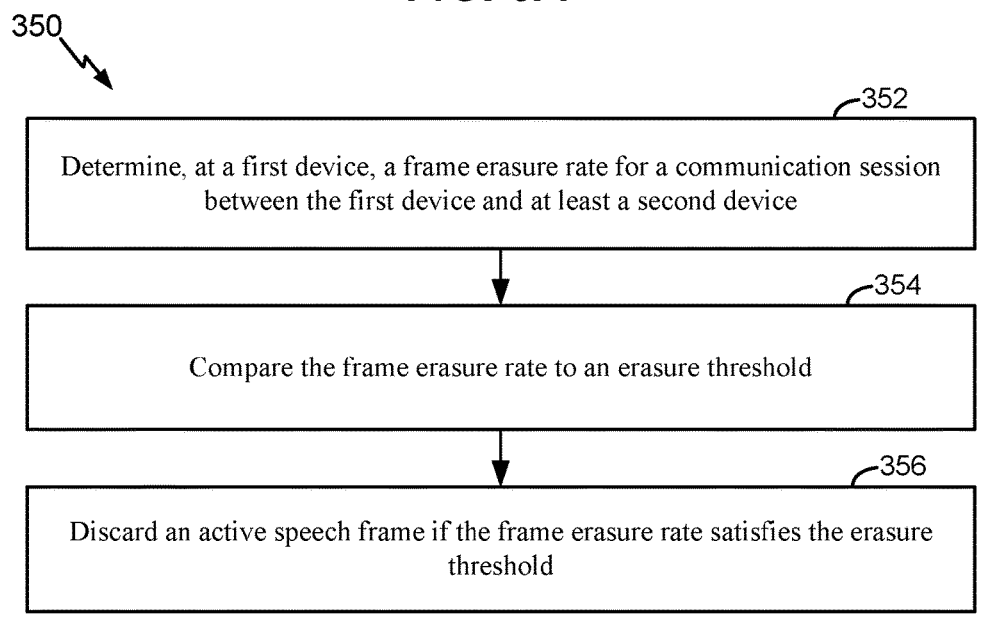
FIG. 3B is a flowchart of another method for controlling frame transmissions.

Referring to FIG. 3B, a particular implementation of a method 350 for controlling frame transmissions is shown. The method 350 may be performed by the components within the first device 102 of FIG. 1, the second device 122 of FIG. 1, or any combination thereof.

The method 350 includes determining, at a first device, a frame erasure rate for a communication session between the first device and at least a second device, at 352. For example, referring to FIG. 1, the first device 102 may determine the frame erasure rate for the communication session between the first device 102 and the second device 122. In other implementations, additional devices may be included in the communication session. As a non-limiting example, a third device may also be included in the communication session. The first device 102 may be a user-end device, an enodeB device, or another other communication device.

The method 350 also includes comparing the frame erasure rate to an erasure threshold, at 354. For example, referring to FIG. 1, the comparison circuitry 116 may compare the frame erasure rate received from the second device 122 to the erasure threshold indicated by the erasure rate data 107. According to one implementation, the method 350 may include receiving a signal indicating the erasure threshold prior to comparing the frame erasure rate to the erasure threshold. For example, a network device (e.g., an enodeB) may determine erasure threshold and send the signal (indicating the erasure threshold) to the first device 102. According to another implementation, the first device 102 may store data (e.g., the erasure rate data 107) indicating the erasure threshold. According to another implementation, the first device 102 may determine the erasure threshold based on an algorithm. According to another implementation, the method 350 may include receiving a signal indicating the frame erasure rate. The signal may be received from the second device 122. For example, the second device 122 may determine the frame erasure rate for the communication session between the devices 102, 122 and send a signal (indicating the frame erasure rate) to the first device 102.

The method 350 also includes discarding an active speech frame if the frame erasure rate satisfies the erasure threshold, at 356. According to one implementation, the frame erasure rate satisfies the erasure threshold if the frame erasure rate is lower than the erasure threshold. For example, referring to FIG. 1, if the frame erasure rate satisfies the erasure threshold, the first speech vocoder 104 may discard an active speech frame that would otherwise be transmitted to the second device 122. For example, the active frame discard circuitry 119 may remove the active speech frame from a queue of speech frames to be transmitted to the second device 112. After removing the active speech frame from the queue, the active frame discard circuitry 119 may erase (e.g., delete) the active speech frame. Thus, discarding the active speech frame includes bypassing transmission of the active speech frame to reduce transmission power at the first device 102. According to one implementation, a block error rate for the communication session may be reduced to increase power savings at the first device 102 and to improve link budget gains.

The methods 300, 350 of FIGS. 3A-3B may enable the first device 102 to conserve battery power by discarding active speech frames when the frame erasure rate is lower than the erasure threshold. For example, by discarding active speech frames (instead of transmitting the active speech frames) when the frame erasure rate is lower than the erasure threshold, battery drainage associated with the transmitter 108 may be reduced while the communication session between the first device 102 and the second device 122.

The methods 300, 350 of FIGS. 3A-3B may be implemented by a field-programmable gate array (FPGA) device, an application-specific integrated circuit (ASIC), a processing unit such as a central processing unit (CPU), a digital signal processor (DSP), a controller, another hardware device, a firmware device, or any combination thereof. As an example, the methods 300, 350 of FIGS. 3A-3B may be performed by a processor that executes instructions, as described with respect to FIG. 4.

According to one implementation of the present disclosure, a particular method or controlling a block error rate for a communication channel includes determining, at a network device, that a communication session between a first device and a second device supports EVS channel aware mode. The first device and the second device may communicate via a communication channel. For example, referring to FIG. 1, a network device (e.g., the first device 102, the second device 122, or another network device) may determine that the communication session between the devices 102, 122 supports EVS channel aware mode.

The particular method may also include increasing a block error rate for the communication channel in response to determining that the communication session supports an EVS channel CODEC. For example, referring to FIG. 1, a network device (e.g., the first device, 102, the second device 122, or another device) may increase the block error rate for the communication channel in response to determining that the communication session between the devices 102, 122 supports the EVS channel aware CODEC. The EVS CODEC may support different modes. As a non-limiting example, the EVS CODEC may support EVS channel aware mode. As another non-limiting example, the EVS CODEC may support 13.2 kbps non-channel aware mode. The particular method may improve (e.g., increase) link budget gains/coverage for the communication session by increasing the block error rate.

Figure 4:
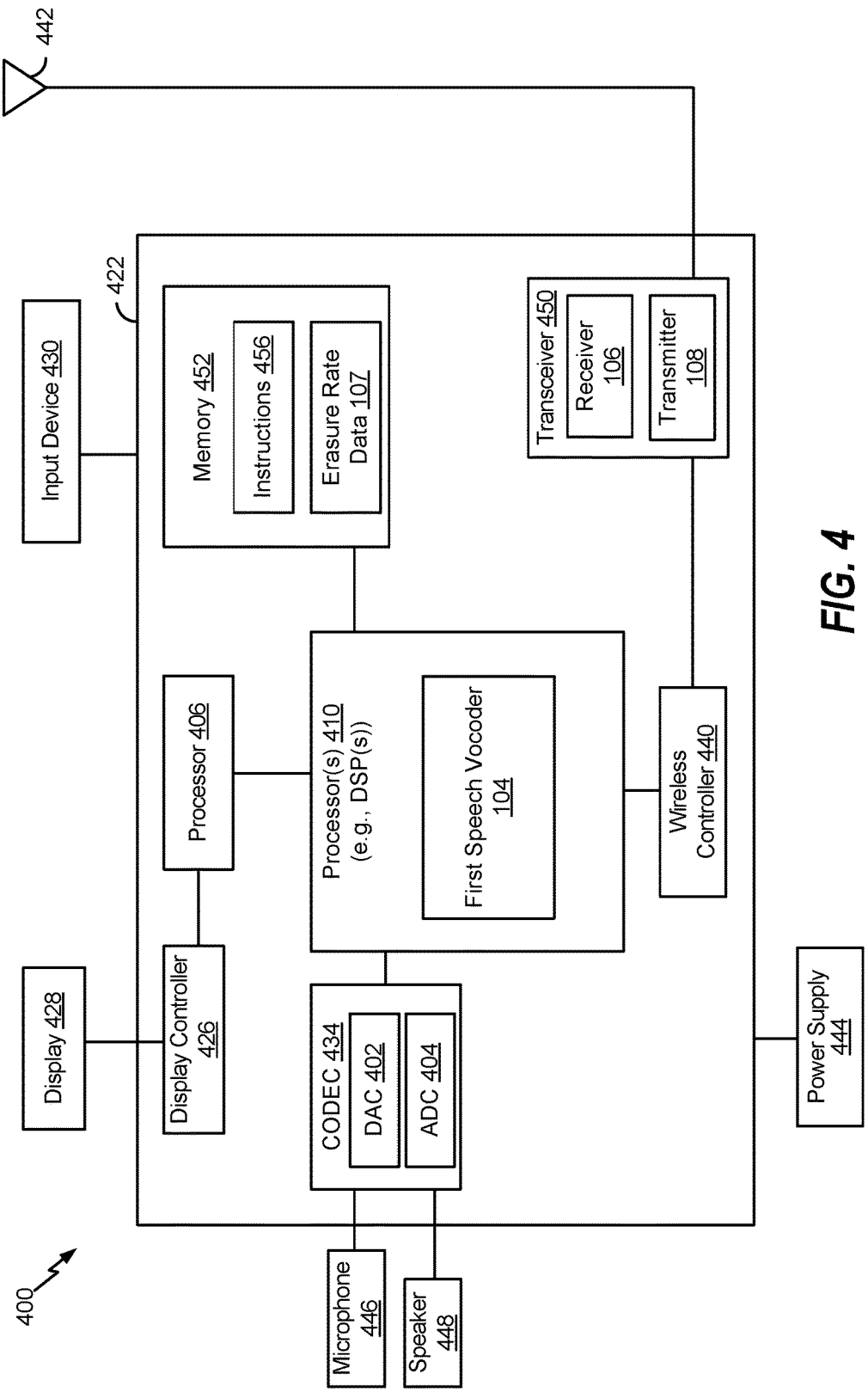
FIG. 4 is a block diagram of a particular illustrative implementation of a device that is operable to control frame transmissions.

Referring to FIG. 4, a block diagram of a particular illustrative implementation of a device 400 (e.g., a wireless communication device) that is operable to control frame transmissions is shown. In various implementations, the device 400 may have more or fewer components than illustrated in FIG. 4. In an illustrative implementation, the device 400 may correspond to the first device 102 of FIG. 1 or the second device 122 of FIG. 1. In an illustrative implementation, the device 400 may operate according to the process 200 of FIG. 2A, the process 250 of FIG. 2B, the methods 300, 350 of FIGS. 3A-3B, or a combination thereof.

In a particular implementation, the device 400 includes a processor 406 (e.g., a CPU). The device 400 may include one or more additional processors 410 (e.g., one or more DSPs). The processors 410 may include the first speech vocoder 104. In an alternate implementation, the first speech vocoder 104 may be included in a different type of processor, such as a CPU (e.g., the processor 406).

The device 400 may include a memory 452 and a CODEC 434. The memory 452 may include instructions 456 that are executable by the processor(s) 410. The device 400 may include a wireless controller 440 coupled, via a transceiver 450, to an antenna 442. In a particular implementation, the transceiver 450 may include the receiver 106, the transmitter 108, or both, of FIG. 1.

The device 400 may include a display 428 coupled to a display controller 426. The device 400 may also include a microphone 446 and a speaker 448 coupled to the CODEC 434. The CODEC 434 may include a digital-to-analog converter 402 and an analog-to-digital converter 404. In a particular implementation, the CODEC 434 may receive analog signals from the microphone 446, convert the analog signals to digital signals using the analog-to-digital converter 404, and provide the digital signals to the first speech vocoder 104. The first speech vocoder 104 may process the digital signals. In a particular implementation, the first speech vocoder 104 may provide digital signals to the CODEC 434. The CODEC 434 may convert the digital signals to analog signals using the digital-to-analog converter 402 and may provide the analog signals to the speaker 448. In a particular implementation, the CODEC 434 represents an analog front-end for audio processing that performs functions such as gain control and parameter adjustment.

The first speech vocoder 104 may be used to implement hardware in conjunction with the techniques as described herein. Alternatively, or in addition, a software (or combined software/hardware) may be implemented in conjunction with the techniques described herein. For example, the memory 452 may include instructions 456 executable by the processors 410 or other processing unit of the device 400 (e.g., the processor 406, the CODEC 434, or both) to perform the process 200 of FIG. 2A, the process 250 of FIG. 2B, the methods 300, 350 of FIGS. 3A-3B, or a combination thereof.

In a particular implementation, the device 400 may be included in a system-in-package or system-on-chip device 422. In a particular implementation, the memory 452, the processor 406, the processors 410, the display controller 426, the CODEC 434, and the wireless controller 440 are included in a system-in-package or system-on-chip device 422. In a particular implementation, an input device 430 and a power supply 444 are coupled to the system-on-chip device 422. Moreover, in a particular implementation, as illustrated in FIG. 4, the display 428, the input device 430, the speaker 448, the microphone 446, the antenna 442, and the power supply 444 are external to the system-on-chip device 422. In a particular implementation, each of the display 428, the input device 430, the speaker 448, the microphone 446, the antenna 442, and the power supply 444 may be coupled to a component of the system-on-chip device 422, such as an interface or a controller. The device 400 may include a mobile communication device, a smart phone, a cellular phone, a tablet, a PDA, or any combination thereof.

In conjunction with the described implementations, an apparatus includes means for determining a frame erasure rate for a communication session between a first device and at least a second device. For example, the means for determining the frame erasure rate may include the first speech vocoder 104 of FIGS. 1 and 4, the memory 105 of FIG. 1, the second speech vocoder 124 of FIG. 1, the processor 406 of FIG. 4, the processors 410 of FIG. 4, the CODEC 434 of FIG. 4, or any combination thereof.

The apparatus may also include means for comparing the frame erasure rate to an erasure threshold. For example, the means for comparing the frame erasure rate to the erasure threshold may include the first speech vocoder 104 of FIGS. 1 and 4, the comparison circuitry 116 of FIG. 1, the second speech vocoder 124 of FIG. 1, the comparison circuitry 136 of FIG. 1, the processor 406 of FIG. 4, the processors 410 of FIG. 4, the CODEC 434 of FIG. 4, or any combination thereof.

The apparatus may further include means for discarding an active speech frame if the frame erasure rate satisfies the erasure threshold. For example, the means for discarding the active speech frame may include the first speech vocoder 104 of FIGS. 1 and 4, the active frame discard circuitry 119 of FIG. 1, the second speech vocoder 124 of FIG. 1, the processor 406 of FIG. 4, the processors 410 of FIG. 4, the CODEC 434 of FIG. 4, or any combination thereof.

Figure 5:
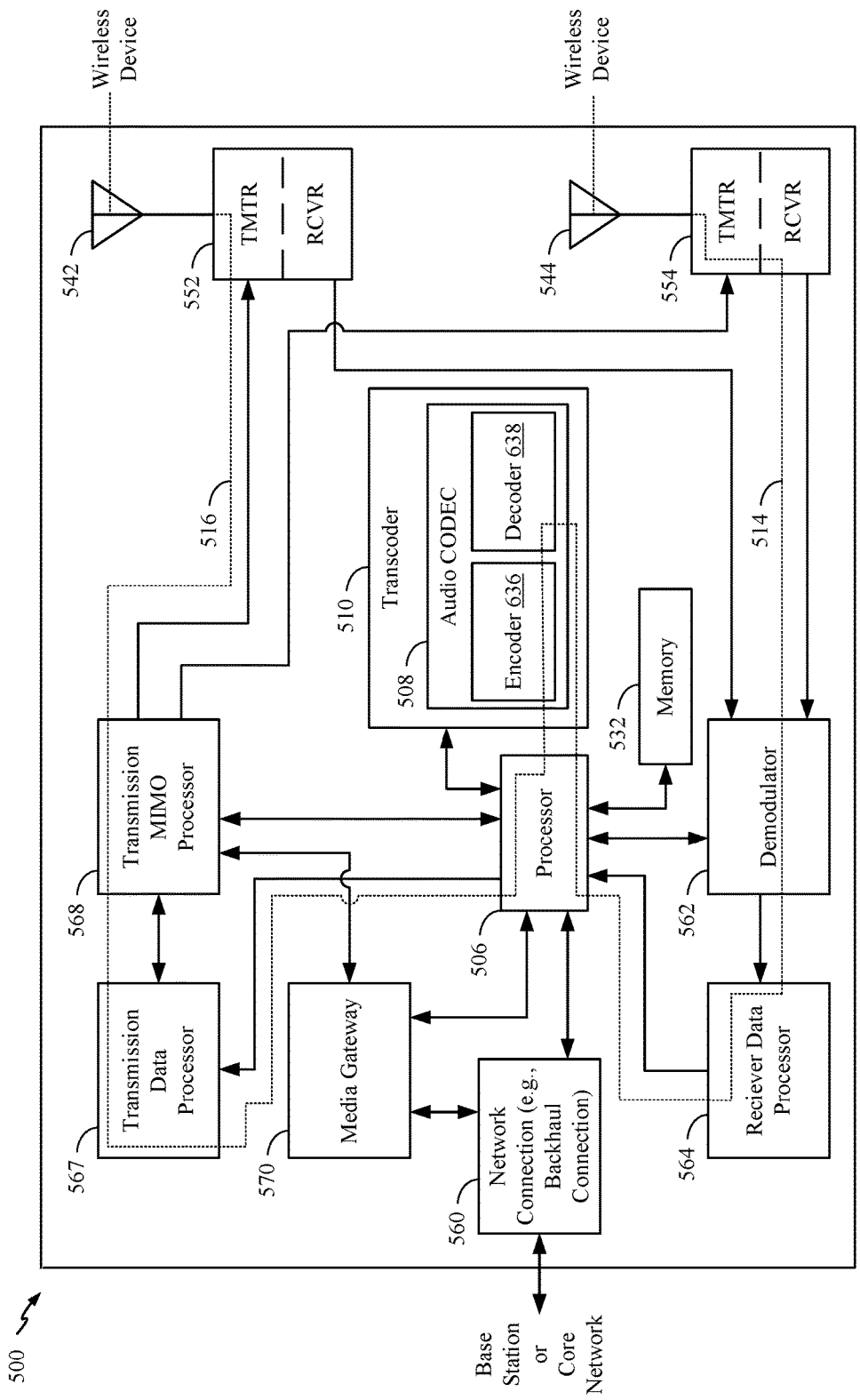
FIG. 5 is a block diagram of a base station that is operable to control frame transmissions.

Referring to FIG. 5, a block diagram of a particular illustrative example of a base station 500 is depicted. In various implementations, the base station 500 may have more components or fewer components than illustrated in FIG. 5. In an illustrative example, the base station 500 may include the system 100 of FIG. 1. In an illustrative example, the base station 500 may operate according to the method 300 of FIG. 3A, the method 350 of FIG. 3B, or a combination thereof.

The base station 500 may be part of a wireless communication system. The wireless communication system may include multiple base stations and multiple wireless devices. The wireless communication system may be a Long Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1×, Evolution-Data Optimized (EVDO), Time Division Synchronous CDMA (TD-SCDMA), or some other version of CDMA.

The wireless devices may also be referred to as user equipment (UE), a mobile station, a terminal, an access terminal, a subscriber unit, a station, etc. The wireless devices may include a cellular phone, a smartphone, a tablet, a wireless modem, a personal digital assistant (PDA), a handheld device, a laptop computer, a smartbook, a netbook, a tablet, a cordless phone, a wireless local loop (WLL) station, a Bluetooth device, etc. The wireless devices may include or correspond to the device 400 of FIG. 4.

Various functions may be performed by one or more components of the base station 500 (and/or in other components not shown), such as sending and receiving messages and data (e.g., audio data). In a particular example, the base station 500 includes a processor 506 (e.g., a CPU). The base station 500 may include a transcoder 510. The transcoder 510 may include an audio 508 CODEC. For example, the transcoder 510 may include one or more components (e.g., circuitry) configured to perform operations of the audio CODEC 508. As another example, the transcoder 510 may be configured to execute one or more computer-readable instructions to perform the operations of the audio CODEC 508. Although the audio CODEC 508 is illustrated as a component of the transcoder 510, in other examples one or more components of the audio CODEC 508 may be included in the processor 506, another processing component, or a combination thereof. For example, a vocoder decoder 538 may be included in a receiver data processor 564. As another example, a vocoder encoder 536 may be included in a transmission data processor 567.

The transcoder 510 may function to transcode messages and data between two or more networks. The transcoder 510 may be configured to convert message and audio data from a first format (e.g., a digital format) to a second format. To illustrate, the vocoder decoder 538 may decode encoded signals having a first format and the vocoder encoder 536 may encode the decoded signals into encoded signals having a second format. Additionally or alternatively, the transcoder 510 may be configured to perform data rate adaptation. For example, the transcoder 510 may downconvert a data rate or upconvert the data rate without changing a format the audio data. To illustrate, the transcoder 510 may downconvert 64 kbit/s signals into 16 kbit/s signals.

The audio CODEC 508 may include the vocoder encoder 536 and the vocoder decoder 538. The vocoder encoder 536 may include an encode selector, a speech encoder, and a music encoder, as described with reference to FIG. 4. The vocoder decoder 538 may include a decoder selector, a speech decoder, and a music decoder.

The base station 500 may include a memory 532. The memory 532, such as a computer-readable storage device, may include instructions. The instructions may include one or more instructions that are executable by the processor 506, the transcoder 510, or a combination thereof, to perform the method 300 of FIG. 3A, the method 350 of FIG. 3B, or a combination thereof. The base station 500 may include multiple transmitters and receivers (e.g., transceivers), such as a first transceiver 552 and a second transceiver 554, coupled to an array of antennas. The array of antennas may include a first antenna 542 and a second antenna 544. The array of antennas may be configured to wirelessly communicate with one or more wireless devices, such as the device 400 of FIG. 4. For example, the second antenna 544 may receive a data stream 514 (e.g., a bit stream) from a wireless device. The data stream 514 may include messages, data (e.g., encoded speech data), or a combination thereof.

The base station 500 may include a network connection 560, such as backhaul connection. The network connection 560 may be configured to communicate with a core network or one or more base stations of the wireless communication network. For example, the base station 500 may receive a second data stream (e.g., messages or audio data) from a core network via the network connection 560. The base station 500 may process the second data stream to generate messages or audio data and provide the messages or the audio data to one or more wireless device via one or more antennas of the array of antennas or to another base station via the network connection 560. In a particular implementation, the network connection 560 may be a wide area network (WAN) connection, as an illustrative, non-limiting example. In some implementations, the core network may include or correspond to a Public Switched Telephone Network (PSTN), a packet backbone network, or both.

The base station 500 may include a media gateway 570 that is coupled to the network connection 560 and the processor 506. The media gateway 570 may be configured to convert between media streams of different telecommunications technologies. For example, the media gateway 570 may convert between different transmission protocols, different coding schemes, or both. To illustrate, the media gateway 570 may convert from PCM signals to Real-Time Transport Protocol (RTP) signals, as an illustrative, non-limiting example. The media gateway 570 may convert data between packet switched networks (e.g., a Voice Over Internet Protocol (VoIP) network, an IP Multimedia Subsystem (IMS), a fourth generation (4G) wireless network, such as LTE, WiMax, and UMB, etc.), circuit switched networks (e.g., a PSTN), and hybrid networks (e.g., a second generation (2G) wireless network, such as GSM, GPRS, and EDGE, a third generation (3G) wireless network, such as WCDMA, EV-DO, and HSPA, etc.).

Additionally, the media gateway 570 may include a transcoder, such as the transcoder 510, and may be configured to transcode data when codecs are incompatible. For example, the media gateway 570 may transcode between an Adaptive Multi-Rate (AMR) codec and a G.711 codec, as an illustrative, non-limiting example. The media gateway 570 may include a router and a plurality of physical interfaces. In some implementations, the media gateway 570 may also include a controller (not shown). In a particular implementation, the media gateway controller may be external to the media gateway 570, external to the base station 500, or both. The media gateway controller may control and coordinate operations of multiple media gateways. The media gateway 570 may receive control signals from the media gateway controller and may function to bridge between different transmission technologies and may add service to end-user capabilities and connections.

The base station 500 may include a demodulator 562 that is coupled to the transceivers 552, 554, the receiver data processor 564, and the processor 506, and the receiver data processor 564 may be coupled to the processor 506. The demodulator 562 may be configured to demodulate modulated signals received from the transceivers 552, 554 and to provide demodulated data to the receiver data processor 564. The receiver data processor 564 may be configured to extract a message or audio data from the demodulated data and send the message or the audio data to the processor 506.

The base station 500 may include a transmission data processor 567 and a transmission multiple input-multiple output (MIMO) processor 568. The transmission data processor 567 may be coupled to the processor 506 and the transmission MIMO processor 568. The transmission MIMO processor 568 may be coupled to the transceivers 552, 554 and the processor 506. In some implementations, the transmission MIMO processor 568 may be coupled to the media gateway 570. The transmission data processor 567 may be configured to receive the messages or the audio data from the processor 506 and to code the messages or the audio data based on a coding scheme, such as CDMA or orthogonal frequency-division multiplexing (OFDM), as an illustrative, non-limiting examples. The transmission data processor 567 may provide the coded data to the transmission MIMO processor 568.

The coded data may be multiplexed with other data, such as pilot data, using CDMA or OFDM techniques to generate multiplexed data. The multiplexed data may then be modulated (i.e., symbol mapped) by the transmission data processor 567 based on a particular modulation scheme (e.g., Binary phase-shift keying ("BPSK"), Quadrature phase-shift keying ("QSPK"), M-ary phase-shift keying ("M-PSK"), M-ary Quadrature amplitude modulation ("M-QAM"), etc.) to generate modulation symbols. In a particular implementation, the coded data and other data may be modulated using different modulation schemes. The data rate, coding, and modulation for each data stream may be determined by instructions executed by processor 506.

The transmission MIMO processor 568 may be configured to receive the modulation symbols from the transmission data processor 567 and may further process the modulation symbols and may perform beamforming on the data. For example, the transmission MIMO processor 568 may apply beamforming weights to the modulation symbols. The beamforming weights may correspond to one or more antennas of the array of antennas from which the modulation symbols are transmitted.

During operation, the second antenna 544 of the base station 500 may receive a data stream 514. The second transceiver 554 may receive the data stream 514 from the second antenna 544 and may provide the data stream 514 to the demodulator 562. The demodulator 562 may demodulate modulated signals of the data stream 514 and provide demodulated data to the receiver data processor 564. The receiver data processor 564 may extract audio data from the demodulated data and provide the extracted audio data to the processor 506.

The processor 506 may provide the audio data to the transcoder 510 for transcoding. The vocoder decoder 538 of the transcoder 510 may decode the audio data from a first format into decoded audio data and the vocoder encoder 536 may encode the decoded audio data into a second format. In some implementations, the vocoder encoder 536 may encode the audio data using a higher data rate (e.g., upconvert) or a lower data rate (e.g., downconvert) than received from the wireless device. In other implementations the audio data may not be transcoded. Although transcoding (e.g., decoding and encoding) is illustrated as being performed by a transcoder 510, the transcoding operations (e.g., decoding and encoding) may be performed by multiple components of the base station 500. For example, decoding may be performed by the receiver data processor 564 and encoding may be performed by the transmission data processor 567. In other implementations, the processor 506 may provide the audio data to the media gateway 570 for conversion to another transmission protocol, coding scheme, or both. The media gateway 570 may provide the converted data to another base station or core network via the network connection 560.

The vocoder decoder 538, the vocoder encoder 536, or both may receive the parameter data and may identify the parameter data on a frame-by-frame basis. The vocoder decoder 538, the vocoder encoder 536, or both may classify, on a frame-by-frame basis, the synthesized signal based on the parameter data. The synthesized signal may be classified as a speech signal, a non-speech signal, a music signal, a noisy speech signal, a background noise signal, or a combination thereof. The vocoder decoder 538, the vocoder encoder 536, or both may select a particular decoder, encoder, or both based on the classification. Encoded audio data generated at the vocoder encoder 536, such as transcoded data, may be provided to the transmission data processor 567 or the network connection 560 via the processor 506.

The transcoded audio data from the transcoder 510 may be provided to the transmission data processor 567 for coding according to a modulation scheme, such as OFDM, to generate the modulation symbols. The transmission data processor 567 may provide the modulation symbols to the transmission MIMO processor 568 for further processing and beamforming. The transmission MIMO processor 568 may apply beamforming weights and may provide the modulation symbols to one or more antennas of the array of antennas, such as the first antenna 542 via the first transceiver 552. Thus, the base station 500 may provide a transcoded data stream 516, that corresponds to the data stream 514 received from the wireless device, to another wireless device. The transcoded data stream 516 may have a different encoding format, data rate, or both, than the data stream 514. In other implementations, the transcoded data stream 516 may be provided to the network connection 560 for transmission to another base station or a core network.

The base station 500 may therefore include a computer-readable storage device (e.g., the memory 532) storing instructions that, when executed by a processor (e.g., the processor 506 or the transcoder 510), cause the processor to perform operations including decoding an encoded audio signal to generate a synthesized signal. The operations may also include classifying the synthesized signal based on at least one parameter determined from the encoded audio signal.

The techniques described above may be compatible with Third Generation Partnership Project (3GPP) networks. For example, quality of experience across particular metrics (e.g., speech quality, speech intelligibility, error resiliency, and call capacity) of AMR-WB in today's commercial VoLTE networks is: AMR-WB at 12.65 kbps operating over a unicast LTE PS channel with 1% FER per mobile link (as specified for QCI=1) resulting in 2% total FER in mobile-to-mobile calls. About 90% of the cell area has an end-to-end FER<=2%. This may be interpreted to mean that the reference "HD Voice" coverage is equivalent to 90% of the cell area. In the remaining 10% the AMR-WB codec speech quality starts to degrade at FERs above 2%.

The MCPTT service can be operated over three types of bearers depending on the network topology that is most appropriate among those available. MCPTT can be operated over unicast channels in the same way the teleconferencing is performed in today's mobile networks using a central conferencing server for duplicating and distributing media. Each of the LTE unicast channels may be a power-controlled channel that also uses retransmission schemes such as HARQ to provide a target BLER or packet loss rate to the VoIP frames transmitted over the channel. When using AMR-WB in this topology, the coverage, error-resiliency, speech quality, speech intelligibility, and call capacity may be equivalent to that of "HD Voice."

When multiple participants in a group are in a single cell the system can reduce the resources to support the users by having the users share a common downlink MBMS bearer that is not power-controlled. There may be no dynamic feedback by which the eNB can decide to dynamically adjust its transmission resources to improve error performance or meet a target error rate. The use of retransmissions is "blind" in that the retransmissions are not sent based on dynamic feedback such as ACK/NACKs. These retransmissions cannot be used to guarantee a certain level of performance or target error rate throughout the cell. Therefore, error rates on the MBMS bearer can vary considerably throughout the cell, e.g., indoors, basements, elevators, stairwells, or the edge of cell in an SC-PTM topology.

The topology for using an MBMS bearer may be configured as a Single-Cell Point-to-Multipoint (SC-PTM) bearer where adjacent cells do not necessarily transmit the same group's content on the same MBMS bearer. In this topology the adjacent cells typically interfere with the MBMS bearer in the serving cell resulting in poorer coverage than the MBSFN topology. The topology may also be part of a MBSFN, where all the cells are broadcasting the same content on the same MBMS bearers, preventing inter-cell interference and allowing the users to combine these transmissions to improve coverage and reception. Unless the MCPTT group is very large and spanning a large proportion of an operator's network, the system will most likely use SC-PTM in the cells serving the group as this uses less of the overall network resources.

LTE-Direct communication is a broadcast mechanism (no physical layer feedback) that defines two physical channels, control and data, for communication between two (or more) UEs. The resources used for direct communication comprise of control and data resources. For in-network operation, a control resource pool is provided via RRC signaling while for off-network operation, the control resource pool is pre-configured. Further, two modes of resource allocation are supported: Mode 1 (in-network) and Mode 2 (in-network and off-network). In Mode 2, the transmitting UEs determine the resources to be used for control and data transmission. UE transmits control to announce resources to be used for subsequent data transmission. Receiving UEs monitor the control resources to determine when to wake-up and listen for data transmission.

Enhanced Voice Services (EVS) is a new speech codec standard (part of 3GPP Release 12) which offers a wide range of new features and improvements for low delay real-time communication. Key advancements include significantly improved quality for clean/noisy speech and music content, higher compression efficiency and unprecedented error resiliency to packet loss and delay jitter experienced in PS systems.

In general, EVS-WB codec offers quality significantly better than AMR-WB at a similar bit-rate and quality equivalent to AMR-WB at a lower bit rate. The EVS-SWB codec performance is significantly better than both AMR-WB and corresponding bit rates of EVS-WB. For clean speech content, the lowest bit-rate of EVS-WB, namely 5.9 kbps, can offer quality significantly better than AMR-WB at 8.85 kbps and equivalent to AMR-WB at 12.65 kbps. The subjective quality of EVS-WB coding starting at 9.6 kbps is significantly better than the AMR-WB coding at its highest bit rate of 23.85 kbps. The super-wideband mode of EVS at 13.2 kbps achieves transparency to the direct source and offers quality significantly better than both 23.85 kbps of AMR-WB and 24.4 kbps of EVS-WB.

For noisy speech, EVS-WB at 9.6 kbps offers quality on par with AMR-WB at 12.65 kbps. This has also been shown across different languages/noise types and summarized in TR 26.952. However, none of the noisy speech tests included the presence of a front end noise suppression, which is expected to establish the equivalence to AMR-WB 12.65 kbps quality at a bit-rate lower than 9.6 kbps by providing a higher SNR at the input to the coder. EVS-WB at 13.2 kbps offers quality on par with AMR-WB at approximately twice the bit-rate with consistent progression in subjective quality with increasing bit-rates. The subjective quality of EVS-SWB coding at 13.2 kbps is significantly better than that of AMR-WB at 23.85 kbps and EVS-WB at the same bit-rate. For mixed/music coding under clean channel conditions, both the EVS-WB and SWB codec starting at 13.2 kbps achieves subjective quality that is significantly better than that of AMR-WB at any bit-rate. For North American English music and mixed content, EVS-SWB coding performs significantly better than EVS-WB at the same bit rate.

Most 3GPP networks are expected to be configured such that the FER is around 1% for each link. While the 2% data point was not tested in this test, comparisons are made between the EVS modes versus AMR-WB at the nearest data points namely, 0% (clean channel) and 3% FER. In general, the 13.2 kbps EVS-SWB clean speech performance under impaired channel with channel aware mode enabled is significantly better than without channel aware mode which in turn is significantly better than AMR-WB at its highest bit-rate of 23.85 kbps. For both languages, the quality of EVS SWB 13.2 kbps channel aware and non-channel aware modes in clean channel are significantly better than AMR-WB at its highest bit-rate of 23.85 kbps. For North American English, EVS SWB 13.2 kbps channel aware mode operating at around 6% FER delivers quality on par with that of the highest bit-rate of AMR-WB (23.85 kbps) under no loss. The 13.2 kbps SWB non-channel aware mode is able to achieve the quality equivalence to AMR-WB 23.85 clean channel when operating at around 3% FER. EVS 13.2 kbps channel aware mode even at 10% FER delivers quality better than AMR-WB 23.85 kbps at 3% FER, while the 13.2 kbps EVS SWB non-channel aware mode can operate at 8% FER but achieve quality equivalence to AMR-WB 23.85 kbps at 3% FER. For Danish, EVS SWB 13.2 kbps channel aware mode operating at around 3% FER delivers quality on par with that of the highest bit-rate of AMR-WB (23.85 kbps) under no loss. EVS 13.2 kbps channel aware mode even at 10% FER delivers quality equivalent to AMR-WB 23.85 kbps at 3% FER, while the 13.2 kbps EVS SWB non-channel aware mode can operate at 6% FER to achieve quality equivalence to AMR-WB 23.85 kbps at 3% FER.

In general, the 13.2 kbps EVS-SWB noisy speech performance under impaired channel with channel aware mode enabled is significantly better than without channel aware mode which in turn is significantly better than AMR-WB at its highest bit-rate of 23.85 kbps. For North American English with car noise at 15 dB SNR, EVS 13.2 kbps channel aware mode operating at 10% FER and the EVS SWB non-channel aware mode operating at 6% FER can achieve quality equivalence to AMR-WB 23.85 kbps at 3% FER. For both languages, the 13.2 kbps EVS-WB clean speech performance under impaired channel with and without channel aware mode enabled is significantly better than AMR-WB at 15.85 kbps. For North American English, the 13.2 kbps EVS-WB clean speech performance under impaired channel with channel aware mode enabled is significantly better than without channel aware mode which in turn is significantly better than AMR-WB at 15.85 kbps. The quality of EVS WB 13.2 kbps channel aware and non-channel aware modes in clean channel are significantly better than AMR-WB at 15.85 kbps. Specifically, it can be seen that for both languages tested, the EVS 13.2 kbps channel aware mode operating at 10% FER can deliver quality on par with AMR-WB at 15.85 kbps at 3% FER. In addition, the 13.2 kbps non-channel aware mode can operate at 6% FER to achieve equivalence to AMR-WB 15.85 kbps at 3% FER.

Power controlled LTE unicast channels are typically configured to operate at a target BLER of 1% per link. The EVS-SWB mode operating at 13.2 kbps (channel aware and non channel aware) offers significantly better audio quality than EVS-WB at the same bit-rate. This applies to a wide range of input signals which include clean speech, speech with background noise and mixed/music content. EVS offers significant voice quality improvement over AMR-WB (HD voice). The improved robustness to background noise and resiliency to errors are particularly relevant to MCPTT service and in general is expected to result in better or at least equal speech intelligibility to "HD voice".

Although retransmission schemes such as HARQ maybe used for tight control of the target BLER, due to the power limited uplink, the cell edge or deep indoors may still experience higher BLER (>1%). Under these conditions the EVS WB and SWB channel aware mode may offer significantly better speech quality than AMR-WB at 12.65 kbps due to improved error resiliency. It can be appreciated that the EVS WB channel aware mode at 13.2 kbps can tolerate up to 8% FER and still deliver the same speech quality as AMR-WB 12.65 kbps operating at 2% FER which is center of the cell "HD Voice" speech quality. The ability to sustain the link while tolerating higher path loss results in improved link budget/coverage. The EVS SWB channel aware mode at 13.2 kbps can tolerate even higher FER (up to 10%) for further extending coverage while maintaining HD Voice center of cell speech quality. The 13.2 kbps EVS WB and SWB non-channel aware modes can also operate at higher FER and deliver "HD Voice" center of cell speech quality thereby resulting in improved coverage, albeit lower than that of the channel aware mode. The 13.2 kbps EVS modes utilize the same transport block size as AMR-WB 12.65 kbps. This results in the same cell site voice capacity as AMR-WB 12.65 kbps. If coverage is kept constant, the improved error resiliency can be utilized for capacity gains by increasing the packet loss rate by not transmitting the packet at the UE itself. The power at which each packet is transmitted would not be lowered but this mechanism can result in power savings at the UE due to reduced ON time or reduced number of transmissions (analogous to DTX or blanking but for active speech). Incorporating this into the scheduler can reduce the average number of resource blocks required thereby freeing up resources either to add more users or for best effort traffic. The capacity gains may be directly proportional to the maximum FER rate at which the EVS mode can still maintain HD voice center of cell voice quality. At 13.2 kbps the EVS SWB channel aware mode would offer the highest capacity gains followed by EVS WB channel aware, EVS SWB and WB non-channel aware modes. For example, reducing ON time by 10% (i.e. blanking 10% of the active frame vocoder packets) when operating in EVS SWB channel aware mode can result in 18% capacity gains measured in terms of number of additional users per cell site. The lower bit-rates of EVS, namely the 5.9 VBR and 7.2 kbps WB modes, can offer significant cell site voice capacity improvements due to utilizing smaller transport block sizes/resource blocks.

AMR-WB is unable to meet the reference error resilience, speech quality, and speech intelligibility in all scenarios except for the 1% FER cases. EVS meets or exceeds these reference KPIs in most cases. In addition, both EVS wideband and superwideband modes offer notable improvement in voice quality over AMR-WB under various error conditions. In certain cases the improvement in P.OLQA scores by EVS over AMR-WB is 0.65, while AMR-WB yield low P.OLQA scores around 2.84. This may translate into scenarios where an end user may not understand certain portions of speech with AMR-WB under certain FER conditions in the MBMS coverage area, while EVS would provide clear and meaningful speech. AMR-WB is unable to meet the reference "HD Voice" quality as it suffers from a significant reduction in voice quality during channel errors. From a coverage perspective, this would be experienced as significant degradation in voice quality in areas exhibiting above channel characteristics with errors.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an ASIC. The ASIC may reside in a computing device or a user terminal. In the alternative, the processor and the storage medium may reside as discrete components in a computing device or user terminal.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein and is to be accorded the widest scope possible consistent with the principles and novel features as defined by the following claims.

What is claimed is:

1. A method of controlling frame transmissions, the method comprising:
  determining, at a first device, a frame erasure rate for a
    communication session between the first device and at least a second device, wherein the frame erasure rate corresponds to a rate based on an average number of active frames that did not reach the second device over a time period;

comparing the frame erasure rate to an erasure threshold, wherein the erasure threshold is A) determined based on a signal communicated to the first device via a network or B) specified by an Enhanced Voice Services (EVS) standard; and discarding, at the first device, an active speech frame if the frame erasure rate is lower than the erasure threshold, wherein the active speech frame would otherwise be transmitted to the second device.

2. The method of claim 1, wherein discarding the active speech frame comprises bypassing transmission of the active speech frame.

3. The method of claim 1, wherein the frame erasure rate satisfies the erasure threshold if the frame erasure rate is lower than the erasure threshold.

4. The method of claim 1, further comprising receiving a signal indicating the erasure threshold prior to comparing the frame erasure rate to the erasure threshold, the signal received from a network device.

5. The method of claim 1, wherein the first device stores data indicating the erasure threshold.

6. The method of claim 1, further comprising:
in response to determining that frame erasure rate satisfies the erasure threshold, determining if a particular active speech frame includes a partial copy of a previous frame; and
determining whether the previous frame was transmitted to the second device in response to determining that the particular active speech frame includes the partial copy of the previous frame.

7. The method of claim 6, further comprising transmitting the particular active speech frame to the second device if the previous frame was not transmitted to the second device.

8. The method of claim 6, further comprising, if the previous frame was transmitted to the second device, comparing a first criticality value of the particular active speech frame to a first threshold and comparing a second criticality value of the previous frame to a second threshold.

9. The method of claim 8, further comprising:
transmitting the particular active speech frame to the second device if the first criticality value is not less than the first threshold or if the second criticality value is not less than the second threshold; and
discarding the particular active speech frame if the first criticality value is less than the first threshold and the second criticality value is less than the second threshold.

10. The method of claim 6, further comprising determining whether a first criticality value of the particular active speech frame is less than a third threshold in response to determining that the particular active speech frame does not include the partial copy of the previous frame.

11. The method of claim 10, further comprising transmitting the particular active speech frame to the second device if a first criticality value of the particular active speech frame is not less than the third threshold.

12. The method of claim 10, further comprising discarding the particular active speech frame if a first criticality value of the particular active speech frame is less than the third threshold.

13. The method of claim 1, wherein discarding the active speech frame is performed within a device that comprises one among a mobile device and a base station.

14. The method of claim 1, wherein the frame erasure rate corresponds to Real-Time Transport Protocol (RTP) loss rate.

15. The method of claim 1, further comprising receiving a signal indicating the frame erasure rate, the signal received from the second device.

16. The method of claim 1, wherein discarding the active speech frame reduces an amount of power consumption at the first device.

17. The method of claim 1, wherein discarding the active speech frame increases network capacity.

18. An apparatus comprising:
a rate monitor configured to determine a frame erasure rate for a communication session between a first device and at least a second device, wherein the frame erasure rate corresponds to a rate based on an average number of active frames that did not reach the second device over a time period;
comparison circuitry configured to compare the frame erasure rate to an erasure threshold, wherein the erasure threshold is A) determined based on a signal communicated to the first device via a network or B) specified by an Enhanced Voice Services (EVS) standard; and
active frame discard circuitry configured to discard an active speech frame if the frame erasure rate is lower than the erasure threshold, wherein the active speech frame would otherwise be transmitted to the second device.

19. The apparatus of claim 18, further comprising a transmitter configured to bypass transmission of the active speech frame to the second device.

20. The apparatus of claim 18, wherein the frame erasure rate satisfies the erasure threshold if the frame erasure rate is lower than the erasure threshold.

21. The apparatus of claim 18, further comprising a receiver configured to receive a signal indicating the erasure threshold prior to comparing the frame erasure rate to the erasure threshold, the signal received from a network device.

22. The apparatus of claim 18, further comprising a speech vocoder configured to determine the erasure threshold based on an algorithm.

23. The apparatus of claim 18, further comprising a speech vocoder configured to:
in response to determining that frame erasure rate satisfies the erasure threshold, determine if a particular active speech frame includes a partial copy of a previous frame; and
determine whether the previous frame was transmitted to the second device in response to determining that the particular active speech frame includes the partial copy of the previous frame.

24. The apparatus of claim 23, further comprising a transmitter configured to transmit the particular active speech frame to the second device if the previous frame was not transmitted to the second device.

25. The apparatus of claim 23, wherein, if the previous frame was transmitted to the second device, the comparison circuitry is further configured to:
compare a first criticality value of the particular active speech frame to a first threshold; and
compare a second criticality value of the previous frame to a second threshold, and
wherein the speech vocoder is further configured to:
initiate transmission of the particular active speech frame to the second device if the first criticality value is not less than the first threshold or if the second criticality value is not less than the second threshold; and discard the particular active speech frame if the first criticality value is less than the first threshold and the second criticality value is less than the second threshold.

26. The apparatus of claim 18, further comprising:
an antenna; and
a receiver coupled to the antenna and configured to receive an encoded audio signal.

27. The apparatus of claim 26, wherein the antenna, the receiver, the rate monitor, the comparison circuitry, and the active frame discard circuitry are integrated into a mobile device or a base station.

28. A non-transitory computer-readable medium comprising instructions for controlling frame transmissions, the instructions, when executed by a processor, cause the processor to perform operations comprising:
determining, at a first device, a frame erasure rate for a communication session between the first device and at least a second device, wherein the frame erasure rate corresponds to a rate based on an average number of active frames that did not reach the second device over a time period;
comparing the frame erasure rate to an erasure threshold, wherein the erasure threshold is A) determined based on a signal communicated to the first device via a network or B) specified by an Enhanced Voice Services (EVS) standard; and
discarding, at the first device, an active speech frame if the frame erasure rate is lower than the erasure threshold, wherein the active speech frame would otherwise be transmitted to the second device.

29. The non-transitory computer-readable medium of claim 28, wherein discarding the active speech frame comprises bypassing transmission of the active speech frame.

30. An apparatus comprising:
means for determining, at a first device, a frame erasure rate for a communication session between a first device and at least a second device, wherein the frame erasure rate corresponds to a rate based on an average number of active frames that did not reach the second device over a time period;
means for comparing the frame erasure rate to an erasure threshold, wherein the erasure threshold is A) determined based on a signal communicated to the first device via a network or B) specified by an Enhanced Voice Services (EVS) standard; and
means for discarding, at the first device, an active speech frame if the frame erasure rate is lower than the erasure threshold, wherein the active speech frame would otherwise be transmitted to the second device.

31. The apparatus of claim 30, further comprising means for bypassing transmission of the active speech frame.

* * * * *